United States Patent
Broughton et al.

(10) Patent No.: US 10,008,309 B2
(45) Date of Patent: Jun. 26, 2018

(54) POWER/FIBER HYBRID CABLE FOR INDOOR USE

(71) Applicants: CommScope Connectivity Belgium BVBA, Kessel-Lo (BE); CommScope Technologies LLC, Hickory, NC (US)

(72) Inventors: Adam Broughton, Harrisburg, PA (US); David J. Walker, Runcorn (GB); Aly Fahd, Chester (GB)

(73) Assignee: COMMSCOPE CONNECTIVITY BELGIUM BVBA (BE)

( * ) Notice: Subject to any disclaimer, the term of this patent is extended or adjusted under 35 U.S.C. 154(b) by 0 days. days.

(21) Appl. No.: 15/538,952

(22) PCT Filed: Dec. 18, 2015

(86) PCT No.: PCT/US2015/066899
§ 371 (c)(1),
(2) Date: Jun. 22, 2017

(87) PCT Pub. No.: WO2016/106152
PCT Pub. Date: Jun. 30, 2016

(65) Prior Publication Data
US 2017/0365379 A1 Dec. 21, 2017

Related U.S. Application Data

(60) Provisional application No. 62/095,709, filed on Dec. 22, 2014.

(51) Int. Cl.
*H01B 11/22* (2006.01)
*G02B 6/02* (2006.01)

(52) U.S. Cl.
CPC .......... *H01B 11/22* (2013.01); *G02B 6/02395* (2013.01)

(58) Field of Classification Search
CPC ............................. H01B 11/22; G02B 6/02395
(Continued)

(56) References Cited

U.S. PATENT DOCUMENTS 4,729,628 A * 3/1988 Kraft .................... G02B 6/4403
174/117 F
4,761,053 A 8/1988 Cogelia et al.
(Continued)

FOREIGN PATENT DOCUMENTS

| CN | 1961237 A | 5/2007 |
|---|---|---|
| JP | 2002-328281 A | 11/2002 |
| WO | 2014/185978 A1 | 11/2014 |

OTHER PUBLICATIONS

International Search Report and Written Opinion of the International Searching Authority for corresponding International Patent Application No. PCT/US2015/066899 dated May 4, 2016, 8 pages.

*Primary Examiner* — Timothy Thompson
*Assistant Examiner* — Charles Pizzuto
(74) *Attorney, Agent, or Firm* — Merchant & Gould, P.C.

(57) ABSTRACT

A hybrid cable is provided that transmits both electrical power and optical signals. The hybrid cable has a transverse cross-sectional shape with multiple lobes and a generally circular outer boundary. At least some of the lobes surround and insulate the electrical conductors. The lobes surrounding the electrical conductors can be torn away from the remainder of the cable while continuing to insulate the electrical conductors.

16 Claims, 4 Drawing Sheets

(58) Field of Classification Search
USPC .............................................. 174/70 R, 70 A
See application file for complete search history.

(56) References Cited

U.S. PATENT DOCUMENTS

| | | |
|---|---|---|
| 5,737,470 A | 4/1998 | Nagano et al. |
| 7,289,704 B1 | 10/2007 | Wagman et al. |
| 7,653,277 B2 | 1/2010 | Andrews et al. |
| 7,672,556 B2 | 3/2010 | Keller |
| 8,452,142 B1 | 5/2013 | Laws et al. |
| 8,538,216 B2 | 9/2013 | Abernathy et al. |
| 2004/0086242 A1 | 5/2004 | McAlpine et al. |
| 2012/0288245 A1* | 11/2012 | Hurley ................. G02B 6/4416 385/101 |
| 2014/0338968 A1* | 11/2014 | Kachmar ............... H01B 1/026 174/70 R |
| 2016/0154186 A1* | 6/2016 | Gimblet ............... G02B 6/3887 385/78 |

* cited by examiner

POWER/FIBER HYBRID CABLE FOR INDOOR USE

CROSS-REFERENCE TO RELATED APPLICATION

This application is a National Stage Application of PCT/US2015/066899, filed on Dec. 18, 2015, which claims the benefit of U.S. Patent Application Ser. No. 62/095,709, filed on Dec. 22, 2014, the disclosures of which are incorporated herein by reference in their entireties. To the extent appropriate, a claim of priority is made to each of the above disclosed applications.

TECHNICAL FIELD

The present disclosure relates generally to cables. More particularly, the present disclosure relates to telecommunications cables capable of transmitting both optical signals and electrical power.

BACKGROUND

In the telecommunications industry, there is a constant demand for higher data transmission rates. To meet this demand, service providers desire to extend fiber optic lines father out into the networks. For example, there is a desire to effectively extend optical fiber to the desk or to near the desk to provide service to computing devices or other active devices. There is also the need to extend optical fiber to active components such as fixed location transceivers (e.g., wireless hot spots, cell sites, nodes, etc.) for generating both large and small wireless coverage areas. One obstacle to the effective outward extension of optical fiber in passive optical networks relates to the ability to deliver power and data to the active devices being serviced by the networks. Optical fiber is capable of supporting high data transmission rates, but does not typically carry power. This is problematic because many active devices desired to be coupled to the fiber optic network cannot be readily or efficiently connected to a separate power source (e.g., a local power source such as a local power grid). Telecommunications cables capable of transmitting both electrical power and optical signals that can be manufactured and installed in an effective, cost effective manner would greatly enhance the ability of service providers to outwardly extend fiber optics into local area networks.

SUMMARY

One aspect of the present disclosure relates to a cable configured to carry both electrical power and optical communications. In certain examples, the cable can be manufactured using a single pass extrusion operation that allows the cable to be manufactured in a cost effective manner. In certain examples, the cable has flexibility suitable for allowing the cable to be routed along tortuous paths commonly encountered in indoor applications. In certain examples, the cable has a configuration that assists in reducing preferential bending. In certain examples, the cable has a round transverse cross-sectional shape, and also has electrical conductors (e.g., wires such as braided or solid copper wires suitable for transmitting electrical power) that can be cleanly and easily separated from the cable while maintaining full coverage of electrical insulation about the separated electrical conductors. In certain examples, the cable can include an optical fiber loosely positioned within a passage of the cable such that the optical fiber can move within the passage. In certain examples, no buffer layers (e.g., loose buffer tubes, tight buffer tubes, semi-tight buffer tubes or like structures) are provided within the passage to protect the optical fiber. In certain examples, the cable relies on the electrical conductors to provide the cable with the requisite tensile and compressive reinforcement, and does not include any supplemental tensile strength members (e.g., aramid yarn, reinforcing rods formed by fiberglass reinforced epoxy, etc.). In certain examples, the cable has a jacket with a round transverse cross-sectional shape, and outer notches that separate the jacket into a plurality of lobes (i.e., segments) with selected lobes containing electrical conductors suitable for transmitting electrical power.

Another aspect of the present disclosure relates to a cable for transmitting both power and optical signals. The cable includes a jacket that defines a central fiber passage that extends along a longitudinal axis of the cable. An optical fiber is positioned within the fiber passage and is free to move within the central fiber passage relative to the jacket. The jacket defines a pair of first opposite lobes and a pair of second opposite lobes. When viewed in transverse cross-section, the lobes project radially outwardly from the longitudinal axis and are positioned about the central fiber passage. The lobes have lengths that run along the longitudinal axis of the cable. The pairs of first and second lobes are separated from one another by exterior notches defined by the jacket. The first lobes contain electrical conductors with material of the first lobes forming dielectric insulating layers about the electrical conductors. The jacket is configured such that the first lobes can be torn away from the second lobes while leaving the dielectric insulating layers surrounding the electrical conductors intact. In certain examples, the jacket is made from a composition that includes plenum rated poly vinyl chloride (PVC). In other examples, the jacket can have low smoke, zero halogen composition.

Another aspect of the present disclosure relates to telecommunications cables that facilitate the fast, low cost and simple deployment of optical fiber and power to interface with active devices. In certain examples, the cable can provide power and optical signals to active devices in a local area network (LAN) such as optical network terminals (ONTs) within a building. The ONTs can be located at or near desktop locations. The ONTs can include circuitry for providing optical-to-electrical and electrical-to-optical signal conversion. The ONTs can be coupled to active devices such as computing devices. In other examples, the active devices can include devices for generating wireless communication coverage areas (e.g., wireless transceivers) and other active devices (e.g., cameras, computing devices, monitors, etc.).

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the examples disclosed herein are based.

DETAILED DESCRIPTION

Figure 1:
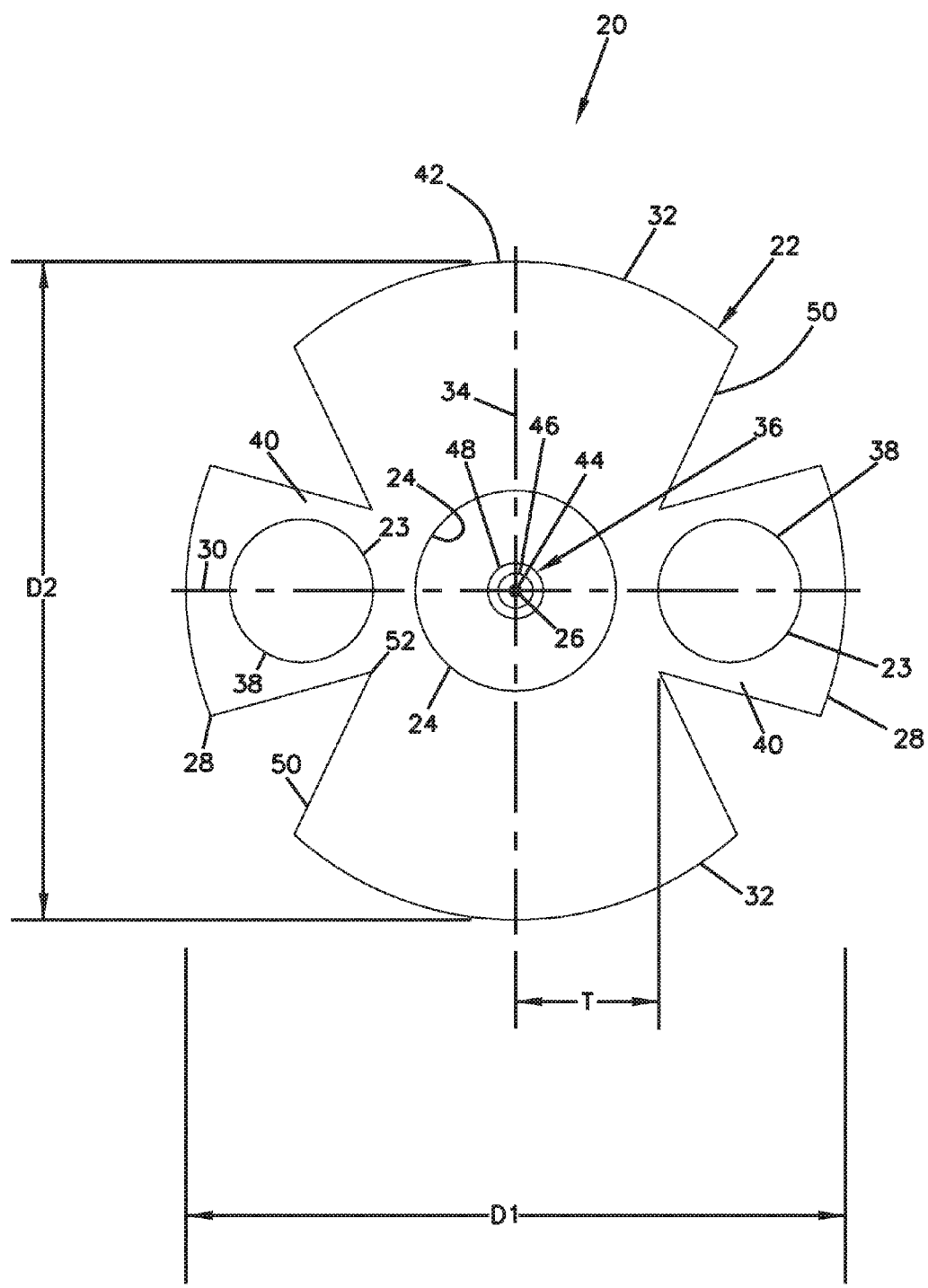
FIG. 1 is a transverse cross-sectional view showing a first example of a power/optical fiber hybrid cable in accordance with the principles of the present disclosure.

Various examples will be described in detail with reference to the figures, wherein like reference numerals represent like parts and assemblies throughout the several views. Any examples set forth in this specification are not intended to be limiting and merely set forth some of the many possible variations of the inventive aspects disclosed herein.

Aspects of the present disclosure relate to a hybrid cable capable of carrying both electrical power and fiber optic signals. In certain examples, the hybrid cable has a construction that is relatively inexpensive to manufacture. In certain examples, the hybrid cable can be manufactured using a single-pass extrusion process. In certain examples, the hybrid cable has a round transverse cross-sectional shape and includes electrical conductors that can be easily separated from the cable while leaving insulation surrounding the electrical conductors intact to ensure safe electrical performance of the electrical conductors. In certain examples, the hybrid cable is configured to allow for movement of the optical fiber within the hybrid cable and to also allow for different strip lengths between the optical fiber and the electrical conductors. In certain examples, hybrid cables in accordance with the principles of the present disclosure are relatively small in size and can have an outer diameter less than or equal to 4 millimeters.

FIG. 1 is a transverse cross-sectional view of a hybrid cable 20 in accordance with the principles of the present disclosure. The hybrid cable 20 includes a jacket 22 defining a central passage 24 that extends along a central longitudinal axis 26 of the hybrid cable 20. The jacket 22 has a transverse cross-sectional shape including a pair of first lobes 28 aligned along a first reference line 30 and a second pair of lobes 32 aligned along a second reference line 34. The first lobes 28 are positioned at opposite sides of the central passage 24 and the second lobes 32 are positioned at opposite sides of the central passage 24. The first and second reference lines 30, 34 intersect at the central longitudinal axis 26. The hybrid cable 20 also includes an optical fiber 36 that extends through the central passage 24, and electrical conductors 38 that extend along the central longitudinal axis and are positioned within the first lobes 28. The first lobes 28 are configured such that jacket material 40 corresponding to the first lobes 28 fully surrounds and electrically insulates the electrical conductors 38. The jacket 22 is configured such that the pair of first lobes 28 can be torn away from the pair of second lobes 32 with the jacket material 40 corresponding to the first lobes 28 continuing to fully surround the electrical conductors 38 after the first lobes 28 have been torn away from the second lobes 32.

Referring still to FIG. 1, the jacket 22 defines a first outer dimension D1 measured along the first reference line 30 and a second outer dimension D2 measured along the second reference line 34. The first and second outer dimensions D1, D2 have magnitudes that are equal to one another or that deviate from one another by no more than 20%. In certain examples, the first and second dimensions D1, D2 have magnitudes that are equal to one another or that deviate from one another by no more than 10%. In still other examples, the first and second dimensions D1, D2 have magnitudes that are equal to one another or that deviate from one another by no more than 5%. In still other examples, the first and second outer dimensions D1, D2 of the jacket 22 are generally equal to one another such that the jacket defines a circular outer boundary 42.

It will be appreciated that the positioning of the electrical conductors 38 with the cable can provide the hybrid cable 20 with a preferential bend orientation. In certain examples, the jacket 22 is configured to reduce the preferential bending effect caused by the positioning of the electrical conductors 38. For example, by providing the second lobes 32 with a size relatively close in size or equal to the size of the first lobes 28, the second lobs 32 can reduce preferential bending in the hybrid cable 20 as compared to the type of preferential bending that would typically be experienced in other types of hybrid cables such as flat hybrid cables. By reducing the effects of preferential bending, the hybrid cable can readily be routed along the types of tortuous paths that may be encountered for many in-building installations. Additionally, in certain examples of the present disclosure, the hybrid cable relies only on the electrical conductors 38 themselves to provide tensile and compressive reinforcement. In this way, the hybrid cable has enhanced flexibility that also assists in routing the hybrid cable along tortuous paths. In certain examples, electrical conductors 38 can have a braided copper construction that enhances flexibility.

In certain examples, the hybrid cable 20 is relatively small in size. For example, the first and second outer dimensions D1, D2 can be less than or equal to 5 millimeters, or less than or equal to 4 millimeters, or less than or equal to 3 millimeters. In certain examples, the jacket 22 can define a circular outer boundary having a diameter less than or equal to 4 millimeters or less than or equal to 3 millimeters. In certain examples, the hybrid cable 20 can have electrical conductors 38 using 18 AWG (American Wire Gauge) wires and a cable diameter less than or equal to 5 millimeters. In other examples, the electrical conductors 38 can be formed by 22 AWG wires and the outer diameter of the jacket 22 can be less than or equal to 4 millimeters. The small size of the hybrid cable assists in routing the hybrid cable through narrow passages typically encountered for indoor installation applications.

In certain examples, the electrical conductors can be sized from 16 to 24 AWG. In other examples, the electrical conductors can be constructed with diameters smaller than 16 AWG wire. In certain examples, the hybrid cable 20 is designed to carry a maximum of 100 watts of power throughput at 48 volts direct current. In certain examples, the hybrid cable 20 is rated for 100 voltage amps (VA) or lower, or is rated for 250 VA or lower. In certain examples, the hybrid cable 20 is plenum rated for indoor applications. In certain examples the hybrid cable 20 is compliant with National Fire Protection Association publication NFPA 70 (National Electric Code) for Class 2 circuits.

As depicted at FIG. 1, only one optical fiber 36 is shown in the central passage 24. In other examples, more than one optical fiber 36 may be provided in the central passage 24. It will be appreciated that the central passage 24 can function as a loose tube to hold the optical fiber 36. Preferably, the optical fiber 36 is not fixed within the passage 24. Instead, the optical fiber 36 can move axially or otherwise within the central passage 24.

In certain examples, the optical fiber 36 includes a central core 44 surrounded by a cladding layer 46 and an outer coating 48. In certain examples, the outer coating 48 can include a polymeric material such as acrylate. The purpose of the outer coating is to protect the glass core 44 and cladding layer 46 and to facilitate handling of the optical fiber. In certain examples, the outer diameter of the optical fiber 36 is defined by the outer coating 48 and is less than or equal to 270 microns. In certain examples, the outer cross-sectional diameter of the protective coating layer of the optical fiber 36 can be between 200 and 300 microns. In the depicted example, no buffer layer (e.g., a tight buffer tube, a loose buffer tube, or a semi-tight buffer tube) is provided between the optical fiber 36 and the portion of the jacket 22 defining the central passage 24. The optical fiber 36 is free to move within the central passage 24 and to contact the jacket 22. In other embodiments, a buffer layer may be provided between the optical fiber 36 and the jacket 22.

Figure 4:
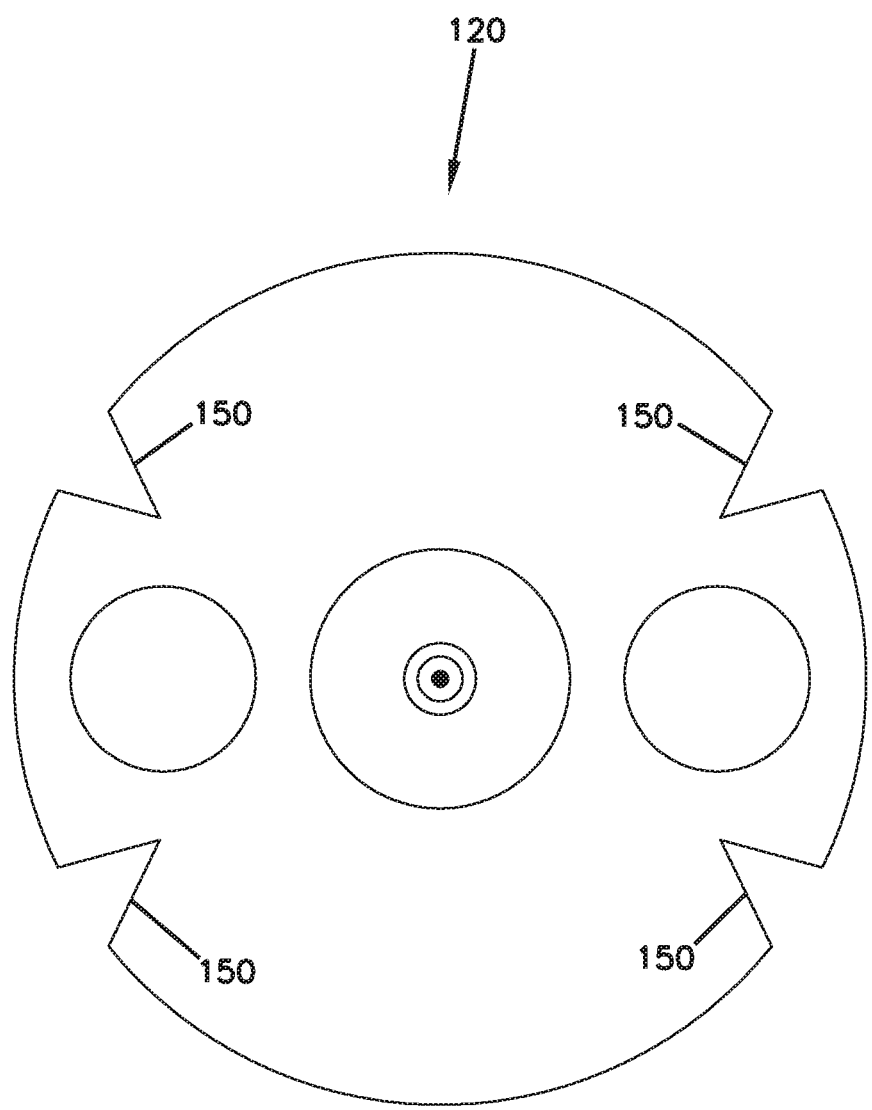
FIG. 4 is a transverse cross-sectional view of a fourth power/optical fiber hybrid cable in accordance with the principles of the present disclosure.

Referring again to FIG. 1, the outer surface of the jacket 22 defines a plurality of outer notches 50 that extend along the length of the hybrid cable 20 and that separate the first lobes 28 from the second lobes 32. The notches 50 can have innermost extents 52 that are spaced from the central passage 24 by a thickness T. The thickness T is selected to allow the first lobes 28 to be easily torn away from the second lobes 32 to separate the electrical conductors 38 from the remainder of the hybrid cable 20. Additionally, the thickness T is selected so that once the first lobes 28 have been torn away from the second lobes 32, the jacket material 40 corresponding to the first lobes 28 continues to fully surround the electrical conductors 38. Therefore, after the first lobes 28 have been torn away from the second lobes 32, sufficient jacket material remains fully around the electrical conductors 38 to support safe electrical performance. In certain examples, the jacket 22 is manufactured from a plenum rated thermal plastic material, and the thickness T is in the range of 0.25 to 1.0 millimeters, or in the range of 0.25-0.75 millimeters, or in the range of 0.25-0.50 millimeters. It will be appreciated that the size of the notches 50 can be varied to provide different performance characteristics. FIG. 4 shows another hybrid cable 120 in accordance with the principles of the present disclosure having notches 150 that are smaller than the notches 50 depicted in the embodiment of FIG. 1.

In certain examples, the jacket material corresponding to the first lobes 28 that continues to fully surround the electrical conductors 38 after the first lobes 28 have been torn away from the second lobes 32 has a minimum thickness of at least 0.010 inches (0.25 millimeters). By tearing the first lobes 28 away from the second lobes 32, the electrical conductors 38 can be more easily electrically connected to a corresponding electrical connector. In certain examples, cable retention can be provided via electrical contacts that engage the electrical conductors 38. The ability to effectively and cleanly tear the first lobes 28 away from the second lobes 32 also allows for different strip lengths between the electrical conductors 38 and the optical fiber 36 thereby facilitating separate connection of the optical fiber 36 to an optical connection point and the electrical conductors 38 to electrical connection points.

It will be appreciated that the design of the hybrid cable 20 is adapted to allow the hybrid cable 20 to be manufactured at a relatively low cost. For example, a single-pass extrusion that allows the electrical conductors 38 to be jacketed at the same time the jacket 22 is formed about the optical fiber 36. For example, a pressure extruder can extrude thermo-plastic material through an extrusion crosshead having a tip and die arrangement that allows electrical conductor passage 23, the central passage 24 and the notches 50 to be formed simultaneously in a single-pass extrusion process. It will be appreciated that the optical fiber 36 and the electrical conductors 38 can be run concurrently through the extrusion crosshead to be placed within their respective passages defined within the jacket 22. In certain examples, the extrusion process can be a pressure or semi-pressure extrusion process where product leaves the crosshead at the desired shape. In other examples, extrusion process can be an annular extrusion process where the product is drawn down after extrusion.

Figure 2:
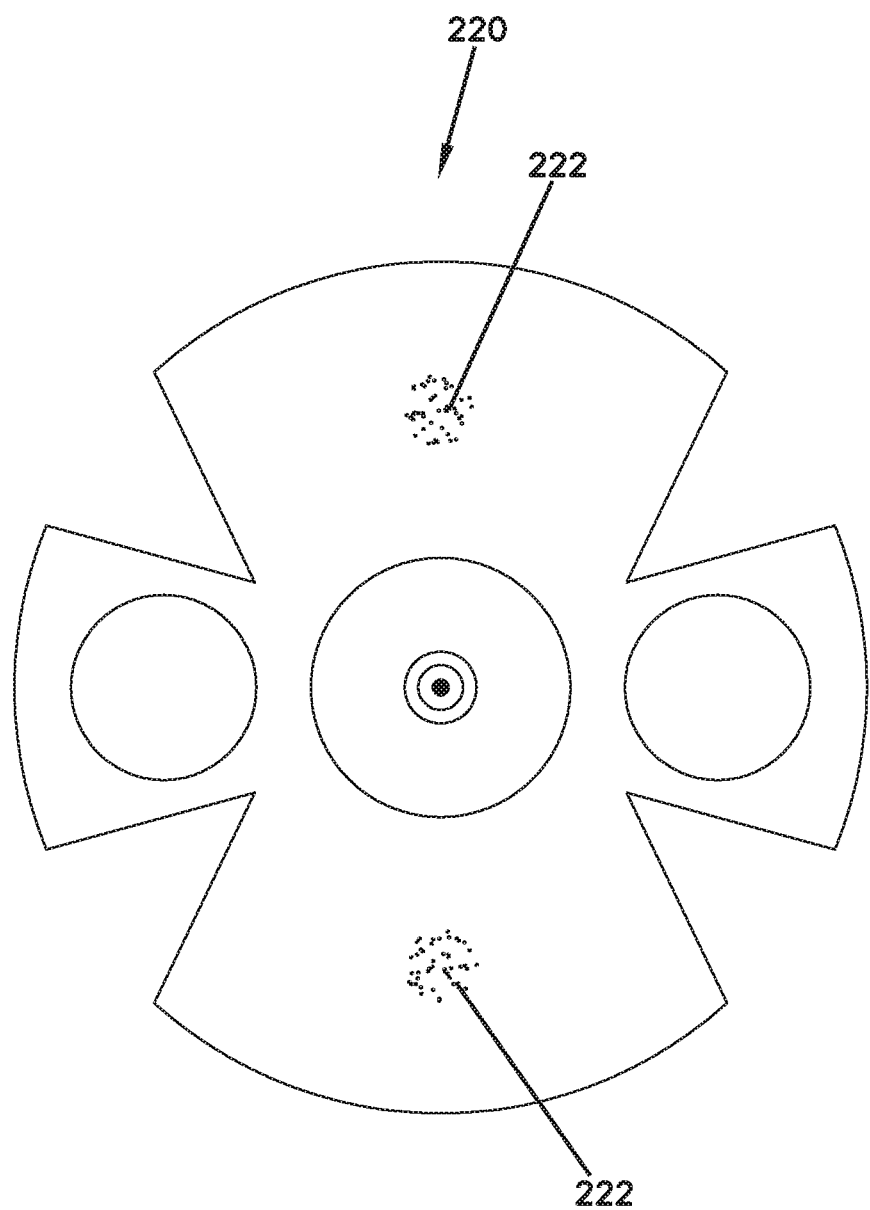
FIG. 2 is a transverse cross-sectional view of a second example power/optical fiber hybrid cable in accordance with the principles of the present disclosure.

In the depicted embodiment of FIG. 1, the electrical conductors 38 provide all the requisite tensile reinforcement required by the hybrid cable 20. In such an embodiment, no supplemental strength members are provided within the second lobes 32 or elsewhere within the hybrid cable 20. If additional tensile reinforcement is required, further reinforcing elements can be incorporated into the hybrid cable. For example, FIG. 2 shows an alternative hybrid cable 220 in which additional strength elements 222 have been incorporated into the second lobes 32. In certain examples, the strength elements can include reinforcing fibers (e.g., E-glass, S-glass, Aramid yarn, etc.) or reinforcing rods typically formed by fiber reinforced epoxy.

In the embodiment of FIG. 1, the central passage 24 is shown as being only occupied by the optical fiber 36 such that no additional components are positioned within the central passage 24. In alternative embodiments, the central passage 24 may contain additional components. For example, water blocking material such as water blocking gel or super absorbent material may be provided within the central passage 24.

Figure 3:
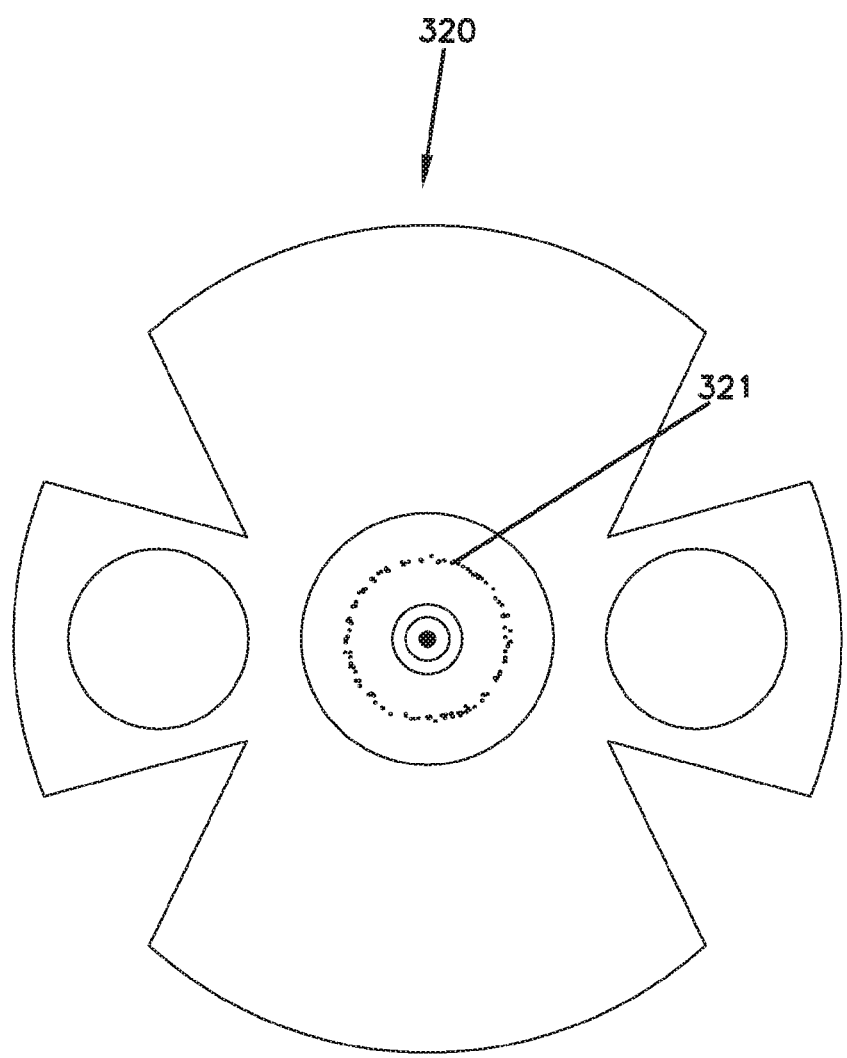
FIG. 3 is a transverse cross-sectional view of a third example of a power/optical fiber hybrid cable in accordance with the principles of the present disclosure.

FIG. 3 shows other hybrid cable 320 having the same structure as the hybrid cable 20 except reinforcing elements 321 have been provided within the central passage of the hybrid cable 320. The reinforcing elements 321 can have a construction of the type previously described herein.

Example material compositions for the outer/jacket include low-smoke zero halogen materials such as low-smoke zero halogen polyolefin and polycarbon. In other embodiments, the base material can include thermal plastic materials suitable for single-pass extrusion operations such as polyethylene, polypropylene, ethylene-propylene, copolymers, polystyrene and styrene copolymers, polyvinyl chloride, polyamide (nylon), polyesters such as polyethylene terephthalate, polyetheretherketone, polyphenylene sulfide, polyetherimide, polybutylene terephthalate, as well as other plastic materials. In still other embodiments, the outer jacket can be made of low density, medium density or high density polyethylene materials. Such polyethylene materials can include low density, medium density or high density ultra-high molecular weight polyethylene materials.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:
1. A hybrid cable comprising:
   a jacket defining a central passage that extends along a central longitudinal axis of the hybrid cable, the jacket having a transverse cross-sectional shape including:
      a pair of first lobes aligned along a first reference line;
      a pair of second lobes aligned along a second reference line, the first and second reference lines being perpendicular to one another, the first and second reference lines intersecting at the central longitudinal axis, the jacket defining a first outer dimension measured along the first reference line, the jacket defining a second outer dimension measured along the second reference line, the first and second outer dimensions having magnitudes that are equal to one another or that deviate from one another by no more than 20 percent;

at least one optical fiber that extends through the central passage;

electrical conductors that extend along the central longitudinal axis and that are positioned within the first lobes such that jacket material corresponding to the first lobes fully surrounds and electrically insulates the electrical conductors; and the pair of first lobes being configured to be torn away from the pair of second lobes with the jacket material corresponding to the first lobes continuing to fully surround the electrical conductors after the first lobes have been torn away from the second lobes.

2. The hybrid cable of claim 1, wherein the first and second outer dimensions have magnitudes that are equal to one another or that deviate from one another by no more than 10 percent.

3. The hybrid cable of claim 1, wherein the first and second outer dimensions have magnitudes that are equal to one another or that deviate from one another by no more than 5 percent.

4. The hybrid cable of claim 3, wherein the transverse cross-sectional shape of the jacket defines a circular outer boundary.

5. The hybrid cable of claim 4, wherein the circular outer boundary defines a diameter less than 5 millimeters.

6. The hybrid cable of claim 1, wherein the magnitudes of the first and second dimensions are each less than 4 millimeters.

7. The hybrid cable of claim 1, wherein the magnitudes of the first and second dimensions are each no greater than 5 millimeters.

8. The hybrid cable of claim 1, wherein the jacket material corresponding to the first lobes that continues to fully surround the electrical conductors after the first lobes have been torn away from the second lobes has a minimum thickness of at least 0.010 inches.

9. The hybrid cable of claim 1, wherein the electrical conductors are sized from 16 to 24 AWG.

10. The hybrid cable of claim 1, wherein the electrical conductors have diameters smaller than 16 AWG wire.

11. The hybrid cable of claim 1, wherein the optical fiber includes a core, a cladding layer surrounding the core and a coating layer surrounding the cladding layer, the coating layer defining an outer diameter of the optical fiber, the outer diameter of the optical fiber being less than or equal to 270 microns.

12. The hybrid cable of claim 11, wherein no buffer layer is provided between the optical fiber and the jacket.

13. The hybrid cable of claim 1, wherein no cable reinforcing members are provided in the second lobes.

14. The hybrid cable of claim 1, wherein cable reinforcing members are provided in the second lobes, the cable reinforcing members having lengths that extend along the central longitudinal axis of the hybrid cable.

15. The hybrid cable of claim 1, wherein the jacket defines a plurality of outer notches that separate the first lobes from the second lobes.

16. The hybrid cable of claim 15, wherein the notches have inner-most extents, and wherein the inner-most extents are spaced from the central passage by jacket material having a thickness in the range of 0.25 to 1.0 millimeters.

* * * * *